Aug. 14, 1962

A. V. L. C. DEBRIE 3,049,051

ARRANGEMENT WITH POLARIZING GRATING FOR THE
PHOTOGRAPHIC ESTABLISHMENT OF FILTERS
WITH BLACK AND WHITE NETWORKS

Filed Nov. 5, 1956

INVENTOR:
Andre Victor Leon Clement
Debrie

BY: Michael S. Striker
Agt.

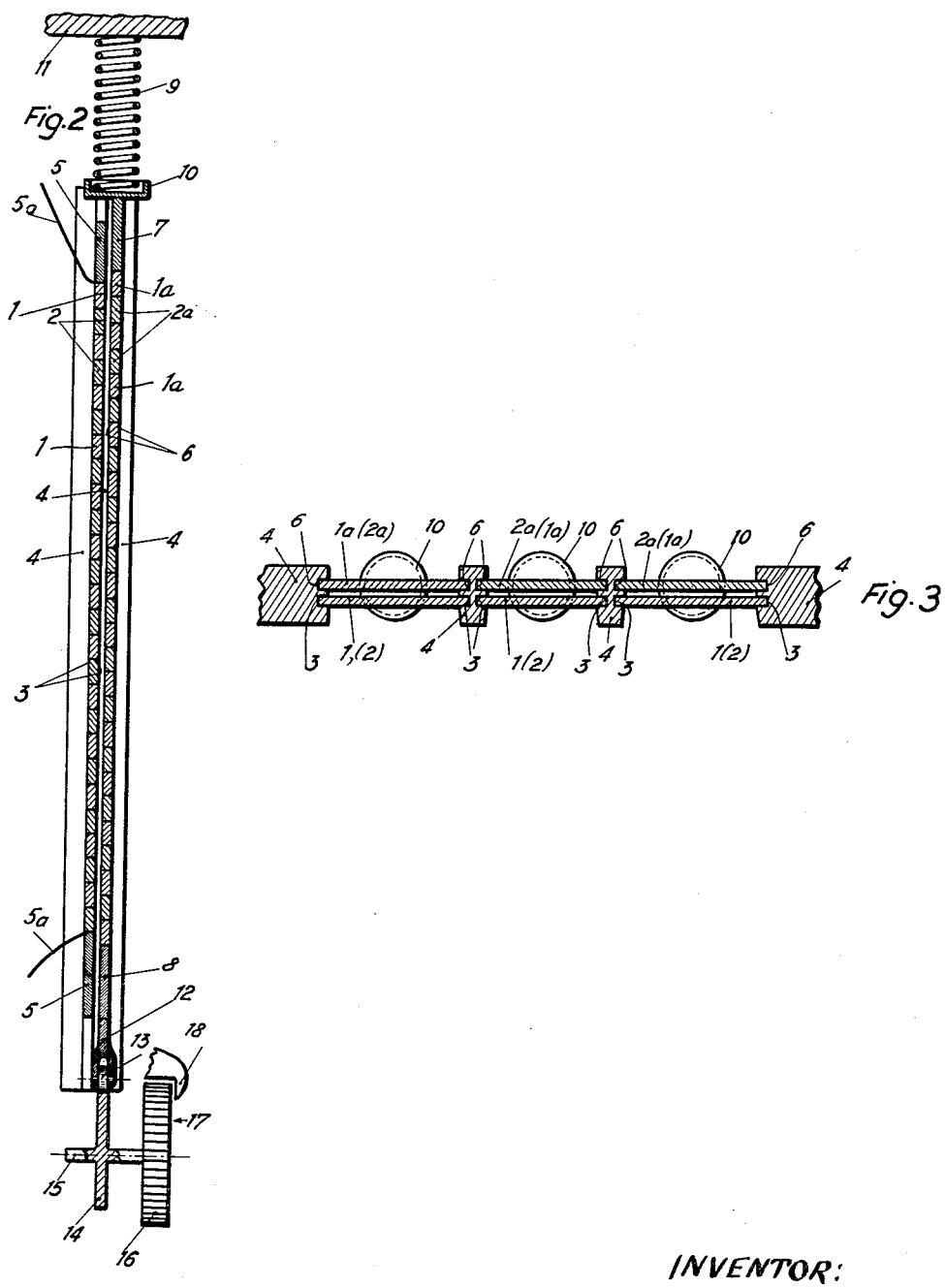

# United States Patent Office 3,049,051
Patented Aug. 14, 1962

3,049,051
ARRANGEMENT WITH POLARIZING GRATING FOR THE PHOTOGRAPHIC ESTABLISHMENT OF FILTERS WITH BLACK AND WHITE NETWORKS
André Victor Léon Clément Debrie, 111 Rue Saint Maur, Paris, France
Filed Nov. 5, 1956, Ser. No. 620,368
Claims priority, application France Jan. 28, 1956
6 Claims. (Cl. 88—24)

It is a well-known fact that in the additive three-color printing of cinematographic films the amount of light and its grade are controlled through the inter-position, in the path of the elementary luminous beam, of filters constituted by a succession of alternatingly transparent and opaque areas equivalent to neutral grey filters, the transmission ratio being adjusted through the relationship between the breadth of the transparent sections and that of the opaque sections.

In such a case, the filtering patterns are obtained by photographing sets of forty patterns for instance carrying each black lines drawn on a white background, predetermined proportions being provided between the thicknesses of the black and of the white lines, said patterns being photographed while, they are illuminated through reflection, on a film having a high contrast factor.

The main weaknesses of this system are:
(a) the slowness of execution ascribable to the finding, handling and classification of the sets of forty patterns, i.e. 120 patterns altogether for each three-color filter,
(b) the extreme fragility of the blacks of these patterns which, as a consequence of said handling, become speedily more or less shiny and produce thus, when they are photographed, impure whites on the negative, which modifies considerably their transmission coefficient, and
(c) the unavoidable soiling of the whites of the patterns which produces negative blacks which are also less pure.

These drawbacks make the margin of safety in the development small, which margin corresponds to the obtention of transparent whites having always the same purity and blacks without defects.

Tests have shown that for two positives obtained through additive means through the agency of two negative patterns reproducing with the same time of exposure the same pattern but which have been developed at different times, the first one may show for instance blacks of a density 2.50 and whites of a density 0.08 whereas the second positive will show for instance blacks of a density 2.50 and whites of a density 0.15, the balance of the values being obviously different on the two positives and said difference being still further increased if negative patterns are used which have been recorded at spaced time intervals from patterns which have also varied through the handling to which they have been subjected in the meantime.

In contradistinction, in the reverse case of two negative patterns the densities of which are for the first one: blacks: 2.50, whites: 0.08, and for the second one: blacks: 2.75, whites: 0.08, the two positive reproductions will be practically identical, which shows the predominant importance of the pure whites in the negative. Now, it is actually the blacks which are the most fragile in the patterns and which produce impure whites.

My invention removes these drawbacks by cutting out the use of series of patterns requiring handling and to select so as to retain those, the values of which are suitable, and by producing a pattern to be illuminated through transparency, the blacks and whites of which are adjustable at will and are finally photographed.

My invention is chiefly constituted by an arrangement of an optic frame illuminated through transparency and adapted to be photographed so as to produce a reduced scale picture constituted, after treatment of the sensitive surface which has been exposed, by at least one network of parallel lines alternatingly opaque and transparent: said arrangement being characterized for each network by two superposed rows of small transparent elongated rectangular surfaces set side by side in succession with the edges of their longer sides in contact, one at least of said rows being longitudinally shiftable in parallelism with the other, the registering areas of the small surfaces in the two rows lying in parallel planes very near one another and the width of all said surfaces in said planes being the same, said surfaces being constituted by transparent strips of polarizing the material of the same colour and the same thickness, the strips in each row having two by two the same angular setting of their polarization planes and the polarization planes of two successive small strips crossing each other at right angles in a manner such that when the strips facing each other and covering one another accurately have the same direction of polarization, the whole system appears as uniformly luminous, while when the strips covering one another exactly have crossed polarities, there is obtained a maximum absorption of light throughout the surface, the intermediate positions with a partial overlapping providing for the passage of or absorbing light alternatingly in a manner such that a system is obtained constituted by lines which are alternatingly opaque and of a luminous grey, of a very high contrast, the density of which depends solely on the amount of overlapping which amount is equal to the relative shifting between the rows as obtained mechanically and capable of being defined accurately, said system, when photographed, giving after a suitable development alternating opaque and transparent areas in a predetermined ratio forming a masking pattern of predetermined size.

This arrangement of a variable pattern obtained through overlapping of polarizing elements cuts out the major drawback which has been mentioned above. The execution of the pattern to be photographed is performed with the desired value for the ratio between the width of the transparent sections and that of the opaque sections, said value being adjusted by operating rotary knobs or levers with reference indices which control the overlapping of the sections inside the luminous beams and the breadth of the strips allowing the light to pass and stopping said passage. I obtain thus the desired effect of a black and white pattern operating through transparency and not through reflection, while the complete cutting out of the formerly used sets of easily worn patterns on which patterns were drawn, cuts out the drawbacks due to their fragile surface.

The taking of views through transparency in polarized light allows obtaining very high contrast factors between the blacks and the whites through the fact that the alternate strips produced through the shutting off and through the passage of the light respectively are perfectly homogeneous. With a very high safety margin during development, I may obtain blacks, the density of which ranges to either side of a very high value, the background fog being practically reduced to zero, so that the results are always uniform.

To better define the invention, an embodiment thereof illustrated very diagrammatically is shown by way of example and in a non-limiting sense in the accompanying drawings, in which:

FIG. 1 is a plan view of an arrangement according to my invention incorporating three rows of small filtering surfaces arranged in parallelism lengthwise with the ruled elements of each row arranged transversely, the photographic reproduction of these three rows, after adjustment of the passage of the light in predetermined proportions in each row, producing masking strips for the adjustment of three luminous beams of the elementary colors, forming the printing light suiting each scene of a color film in accordance with my copending application claiming priority of my French application, provisional Number 702,335 filed on November 10, 1955 and concerning said masking strips.

FIG. 2 is a corresponding cross-sectional, longitudinal, elevational view through line A—A of FIG. 1.

FIG. 3 is a corresponding transverse elevational sectional view through line B—B of FIG. 1.

In said figures, the same parts are designated by same reference numbers.

Figure 1:
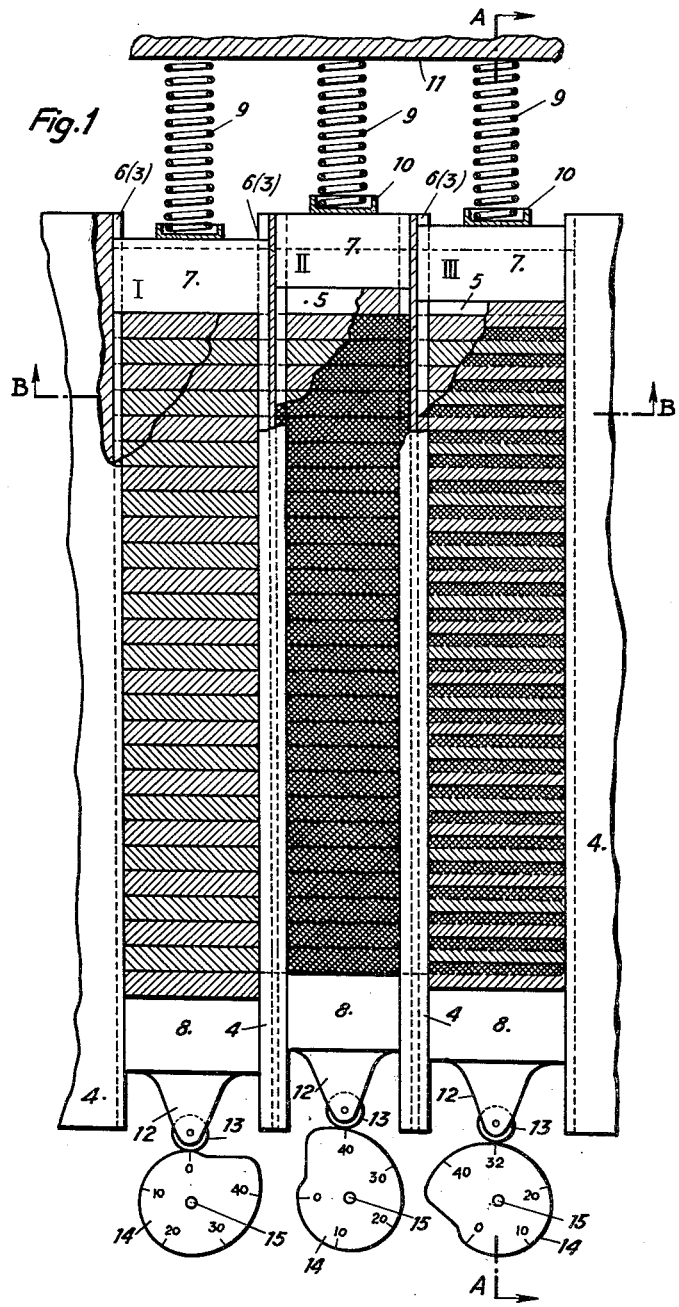

Three rows of rectangular strips of polarizing material such as that known under the registered trade name Polaroid are set side by side, the strips in each row being in adjacent relationship along their long sides.

These strips are arranged with their polarization planes alternatingly in two directions perpendicular to each other.

The strips 1 have one polarization direction and the strips 2 another, said directions crossing each other at 90°. These strips are housed for instance in grooves 3 of members 4 of a stationary frame. The three rows of stationary strips are carried inside a rectangular gate the two ends of which register with the ends of the rows of stationary strips 1 and 2 limited endwise by opaque members 5 and lower covering metal sheets 5a for instance, the two outer longitudinal sides of said gates being constituted by the inner edges of the members 4 on the outside of the outer blade row.

This rectangular gate is illuminated from underneath in a uniform manner by means of non-polarized light which is suitably distributed through any known means not illustrated. The size of said gate and its subdivision in three parts correspond to the size of the masking strip with three ruled patterns which it is desired to obtain through photographic reproduction. Inside grooves 6 which are parallel with and located near the grooves 3, there are located, with the possibility of moving therein, further rows of small strips 1a, 2a, identical with the preceding rows but including one strip more which supplemental strip is set side by side with an outer strip the polarization of which crosses its own.

The strips 1a, 2a are held fast at the end of each row between abutment members 7 and 8 respectively, which slide therewith inside the grooves 6.

On the one hand, the sliding abutment members 7 are constantly urged towards the other members 8 by springs 9 compressed between stationary sections 11 of the frame 4 and dished members 10 secured to the corresponding abutment members 7. Notches in the opaque members 5 allow, if required, the springs 9 and the dished members 11 to pass, the light being stopped by the metal sheets 5a.

At each opposed end, the sliding abutment members 8 extend to form, for instance, a part 12 carrying a roller 13 which abuts for instance against a spiral-shaped cam 14. Each cam 14 revolves around its axis 15 under the action of a control knob 16 rigid with it.

Each knob 16 carries on its outer surface a scale 17 which is easily legible and moves in front of a pointer 18 carried by the frame 4.

The cams and the scales are adjusted in a manner such that the zero corresponds for instance to the registering of the movable rows of strips 1a and 2a with the stationary rows 1—2 in a manner such that the elements having the same plane of polarization 1 and 1a, 2 and 2a are in exact superposition.

The grooves 3 and 6 are formed as close to each other as possible and the rows 1a, 2a move in proximity with the rows 1—2. Under such conditions, when the knob is at zero, the light from the lower illuminating box which is not illustrated passes without any change of polarization through the homologous blades of the superposed rows.

There is a minimum obstruction of light and the superposed rows of strips appear as uniformly illuminated with a maximum intensity.

The row I in FIG. 1 shows such an arrangement of the strips, of the cam and of the sliding abutments.

The row II is illustrated with a maximum shifting of the cam 14 which urges the small strips against the action of the compressed spring 9 so that the strips 1a mask the strips 2 and the strips 2a mask the strips 1.

In this arrangement, the polarization planes crossing each other throughout the surface of the superposed strips, the absorption of light is a maximum and, for a suitable value of the intensity of the luminous source in the lower light box, there passes practically no light through the arrangement and the appearance of the whole row is uniformly dark and practically black.

For an intermediate position such as that illustrated cross-sectionally by the row III in FIG. 2, I obtain in the sections of the blades superposed over sections of same direction of polarization a luminous line and in the sections superposed over sections of a crossed polarization a well-defined black line.

A rotation of the knobs 16 will provide all the ratios between the breadth of the luminous lines and the breadth of the black lines. If, for instance, the scale zero is taken for the whites and the scale 40 for the blacks, FIG. 1 illustrates the illuminations 0—40—32 corresponding after printing of the negative to the desired printing light, taking into account predetermined ratios.

Figure 5:
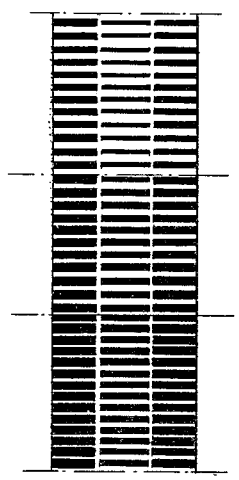
FIG. 5 illustrates by way of example a series of masks obtained with the present invention.

As is shown in FIG. 5, the photograph of this illuminated system and a development with a high contrast factor providing pure whites and opaque blacks will produce a mask of corresponding shading off suiting the printing light. I use for this purpose a camera of the type used for executing microfilms and which is secured in a well-known manner above the system of strips to be photographed.

The illumination being uniform, the durations of exposure are automatically unvarying and the developments are easy. The passage from one combination to another through use of the graduation is an easy and speedy matter.

There is no damage to the ruled system reproduced which may be given a size bestowing it with all possibilities of accuracy.

The system described is applicable for the adjustment of the light regenerated as to composition (color, temperature) and as to intensity.

Obviously, the arrangement may include a number of series of strips which is different and it may be used only for the printing of filters with a single pattern and this may be the case with any size and any proportions without widening the scope of the invention, as defined in the accompanying claims.

In the case where the rows of strips by reason of their size are capable of an objectionable deformation, it is possible also to reinforce mechanically each row as a whole through transparent carriers suitably glued to said blades. It is obviously necessary in this case for the transparent support used to be devoid of optical defects and to show no trace of polarizing power.

The illumination of strips may be made in any suitable light whether monochromatic or compound and the selection of the light may also, if properly made, increase still further the contrasts in an advantageous manner.

The arrangement with polarizing strips forming the object of my invention will be advantageously housed in a conventional manner in a stationary system including in its lower part the illuminating means and above said arrangement a film camera for the successive photographs which will constitute a mask for the printing of successive scenes.

Figure 4:
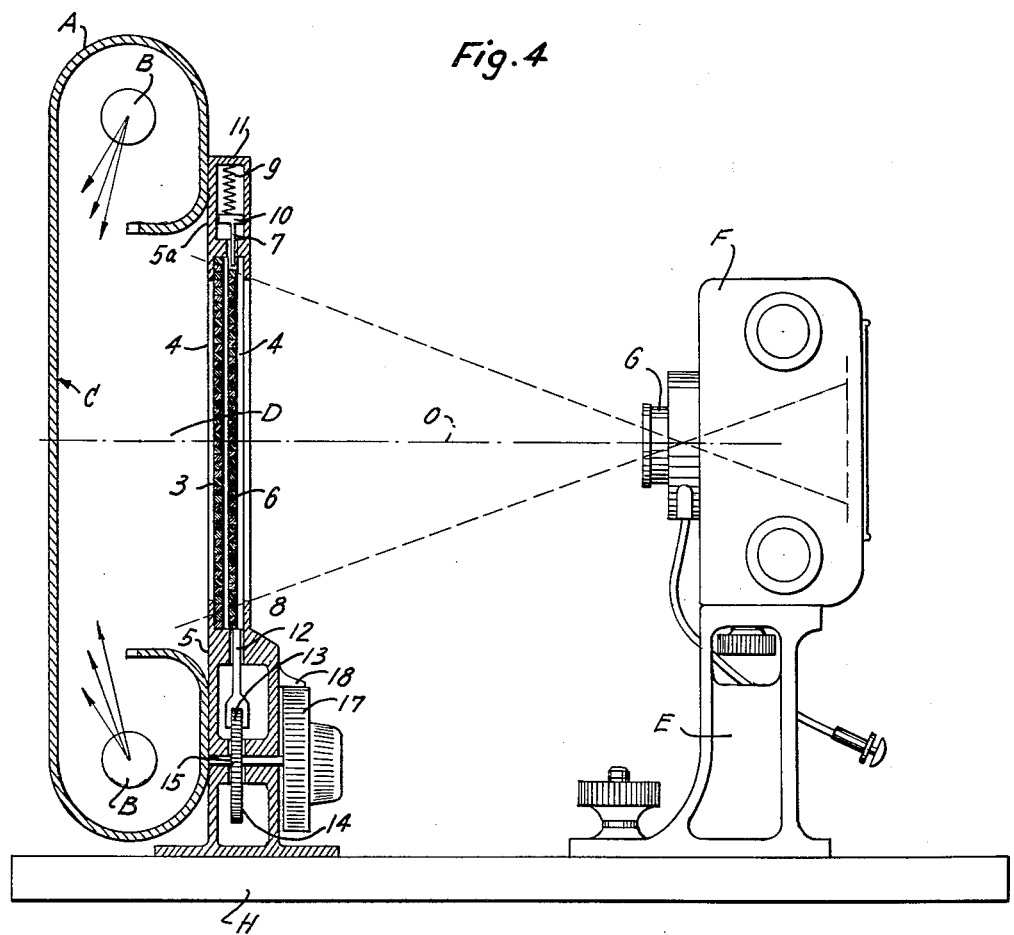
FIG. 4 illustrates diagrammatically one possible apparatus for producing masking strips.

For example, as is shown in FIG. 4, the illuminating box A has lamps B located in its interior for uniformly illuminating the wall C, which may be white, for example, so that light from the lamps B is reflected from the wall C through the window D of the box A, this window D being covered by the structure described above in connection with FIGS. 1–3, as indicated in FIG. 4. On the other side of this structure of FIGS. 1–3 is located a support E whose distance from the box A can be regulated, and this support E carries the camera F provided with an objective G whose optical axis O is normal to the planes in which elements 1, 2, 1a, 2a are located, this optical axis passing through the center of the window D. The entire assembly is carried by a common base H.

The breadths of the three rows of strips controlling the synthesis of white light through three colored beams may be selected so as to have different values for the elementary beams as illustrated in the accompanying drawings.

The mechanism for the shifting of the strips may also be different from that illustrated and constituted by a drum controlling a worm, levers moving in front of scales, etc.

What I claim is:

1. In an apparatus for producing a mask having a network of black and white areas and adapted to be used subsequently as a filter in the printing of photographic film, in combination, a photographic camera having an optical axis extending forwardly from the objective thereof; a light source located forwardly of the camera adjacent said optical axis for directing light toward the camera; a pair of elongated sheet portions of polarizing material located closely adjacent to each other in parallel planes, respectively, which are normal to said axis, said elongated sheet portions being substantially parallel to each other and substantially coextensive and being arranged between said light source and camera so that the light reaching the camera must pass through said sheet portions, each of said elongated sheet portions being of substantially rectangular configuration and being made up of a series of polarizing sections each having a width which is a small fraction of the length of said elongated sheet portion, each extending transversely across the sheet portion and said series of polarizing sections being arranged in a row along said sheet portion from one end to the other end thereof, the polarizing sections of both sheet portions having the same widths, respectively, and each polarizing section of both sheet portions having a plane of polarization at right angles to the plane of polarization of the next preceding and the next following section; guide means guiding one of said elongated sheet portions for longitudinal movement with respect to the other of said sheet portions between one end position where the sections of both sheet portions and their planes of polarization are in complete registry providing minimum obstruction to light passing from said light source to said camera and an opposite end position where the sections of said one sheet portion are located in their entirety directly opposite those sections of the other sheet portion which have perpendicular planes of polarization, respectively, so that substantially no light reaches the camera when said one sheet portion is in its opposite end position; and manually operable moving means cooperating with said one sheet portion for longitudinally moving the latter between its end positions and for locating said one sheet portion in a desired longitudinal position where the polarizing sections of said sheet portions overlap each other to a preselected degree to provide from film in the camera exposed to light passing through said sheet portions a photograph having preselected black and white areas capable of being used subsequently as a filter in the printing of photographs of predetermined subjects.

2. In an apparatus as recited in claim 1, said guide means including a pair of parallel rails formed with parallel grooves directed toward each other and respectively receiving slidably opposite side edges of said one elongated sheet portion.

3. In an apparatus as recited in claim 1, said manually operable moving means comprising a spring means acting on one end of said one elongated sheet portion for urging the latter in one longitudinal direction and a manually movable cam means cooperating with the opposite end of said one elongated sheet portion for longitudinally shifting the latter, said spring means maintaining said one sheet portion in operative relationship with said cam means.

4. In an apparatus for producing a mask having three preselected patterns of black and white areas of preselected sizes and adapted to be used as a filter in the color printing of photographic film, in combination, a photographic camera having an optical axis extending forwardly from the objective thereof; a light source located forwardly of the camera adjacent said optical axis for directing light toward the camera; a first set of three elongated polarizing means in a predetermined position between said light source and camera extending across said optical axis and located in side by side relation with each of said polarizing means having a plurality of different areas having different polarization; a second set of three polarizing means respectively aligned with said first set and being substantially identical and substantially coextensive therewith, so that three pairs of aligned polarizing means are provided; means cooperating with one of the polarizing means of each pair for shifting the same longitudinally with respect to the other of the polarizing means of each pair to provide a selected overlapping relationship between areas of each pair of polarizing means which have different axes of polarization, the movable polarizing means of the three pairs of polarizing means being movable independently of each other into preselected overlapping relationships, whereby the camera is adapted to photograph the plurality of polarizing means after the latter have been preset to provide with the camera a mask having three preselected patterns of black and white areas of preselected sizes and transmission values and adapted to be used as a filter in the color printing of photographic film.

5. In an apparatus for producing a mask having a network of black and white areas and adapted to be used subsequently as a filter in the printing of photographic film, in combination, a photographic camera having an optical axis extending forwardly from the objective thereof; a light source located forwardly of the camera adjacent said optical axis for directing light toward the camera; a pair of elongated sheet portions of polarizing material located closely adjacent to each other in parallel planes, respectively, which are normal to said axis, said elongated sheet portions being substantially parallel to each other and substantially coextensive and being arranged between said light source and camera so that the light reaching the camera must pass through said sheet portions, each of said elongated sheet portions being of substantially rectangular configuration and being made up of a series of polarizing sections extending transversely across the sheet portion and arranged in a row along said sheet portion from one end to the other end thereof, the polarizing sections of both sheet portions having the same widths, respectively, and each polarizing section of both sheet portions having a plane of polarization at right angles to the plane of polarization of the next preceding and the next following section; guide means guiding one of said elongated sheet portions for longitudinal movement with respect to the other of said sheet portions between one end position where the sections of both sheet portions and their planes of polarization are in complete registry providing minimum obstruction to light passing from said light source to said camera and an opposite end position where the sections of said one sheet portion are located in their entirety directly opposite those sections of the other sheet portion which have perpendicular planes of polarization, respectively, so that substantially no light reaches the camera when said one sheet portion is in its opposite end position; and manually operable moving means cooperating with said one sheet portion for longitudinally moving the latter between its end positions and for locating said one sheet portion in a desired longitudinal position where the polarizing sections of said sheet portions overlap each other to a preselected degree to provide from film in the camera exposed to light passing through said sheet portions a photograph having preselected black and white areas capable of being used subsequently as a filter in the printing of photographs of predetermined subjects; a plurality of additional pairs of elongated sheet portions arranged beside each other respectively in said planes alongside of and parallel to and being identical with said first-mentioned pair of elongated sheet portions; and a plurality of guide means and manually operable moving means identical with said first-mentioned guide means and moving means cooperating with one of the elongated sheet portions of said additional pairs of sheet portions for respectively guiding and moving said one additional sheet portions in the same way as said first-mentioned one sheet portion, whereby film in the camera may be simultaneously exposed to light from each of said pairs of sheet portions to provide when developed a photograph having an arrangement of rectangular black and white areas of preselected sizes corresponding to the pattern of the plural sheet portions and each area having light transmission values depending upon the amount of overlap of the associated sections having the same plane of polarization.

6. In an apparatus for producing a mask having three preselected patterns of dark and light areas of preselected sizes and adapted to be used as a filter in the color printing of photographic film with three basic colors adapted to be controlled by the three preselected patterns, in combination, a photographic camera having an optical axis extending forwardly from the objective thereof; a light source located forwardly of the camera adjacent said optical axis for directing light toward the camera; and three independent manually adjustable elongated means located in side-by-side relation between said light source and camera and extending across said optical axis, each of said adjustable elongated means defining a variable pattern of clear and light-obstructing portions for altering with each of said adjustable means light from said light source at preselected portions of said means and preventing at least a portion of the light at said preselected portions from reaching the camera so as to produce a photograph having in side-by-side relation three preselected patterns of dark and light areas adapted to be used as a filter in the color printing of photographic film, each of said three manually adjustable elongated means being adjustable between one end position where almost none of the light is obstructed and another end position where substantially all of the light is obstructed.

References Cited in the file of this patent

UNITED STATES PATENTS

| | | |
|---|---|---|
| 2,186,619 | Sauer | Jan. 9, 1940 |
| 2,255,933 | Land | Sept. 16, 1941 |
| 2,280,358 | Tietig | Apr. 21, 1942 |
| 2,300,970 | Riess | Nov. 3, 1942 |
| 2,617,329 | Dreyer | Nov. 11, 1952 |

FOREIGN PATENTS

| | | |
|---|---|---|
| 453,810 | Great Britain | Sept. 18, 1936 |
| 839,173 | France | Dec. 26, 1938 |
| 867,075 | France | June 30, 1941 |